Nov. 24, 1953  E. R. POWELL  2,660,655
WALKING WELDER
Filed Dec. 16, 1952
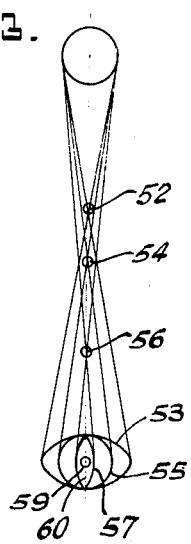
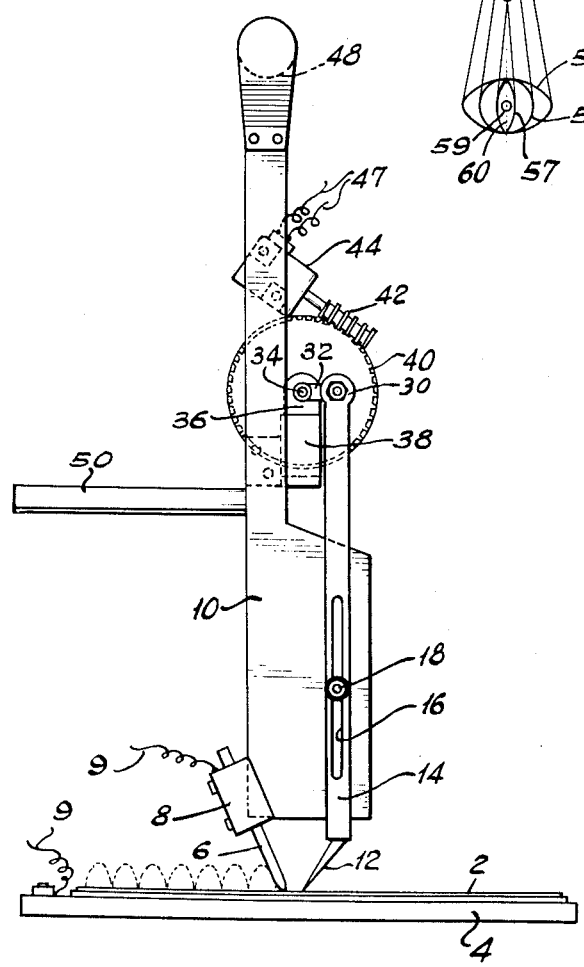
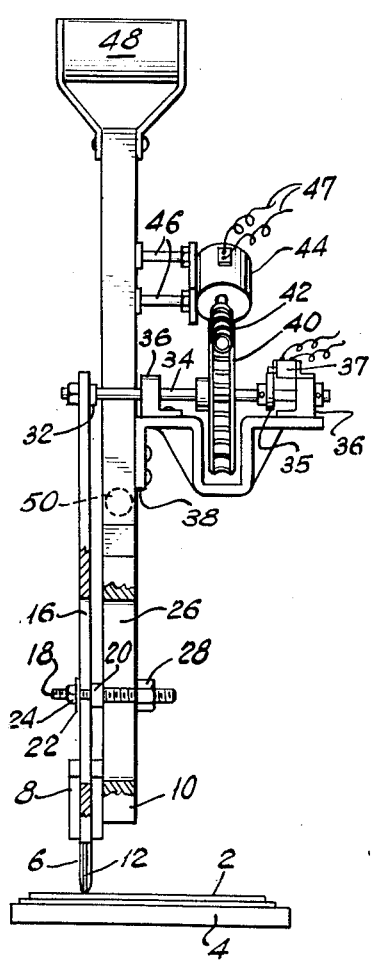
INVENTOR
EDWARD R. POWELL.
BY Virgil C. Kline
ATTORNEY Patented Nov. 24, 1953

2,660,655

UNITED STATES PATENT OFFICE 2,660,655

WALKING WELDER

Edward R. Powell, North Plainfield, N. J., assignor to Johns-Manville Corporation, New York, N. Y., a corporation of New York Application December 16, 1952, Serial No. 326,196

9 Claims. (Cl. 219—4)

The instant invention relates to resistance welding devices and particularly a hand guided welder of the "walking" type, i. e., a welder provided with means for moving it in steps across a work surface, the operator being required only to guide the device. The class of welding to which the device of the instant invention relates is commonly known as spot welding although the device may be adjusted to make a seam weld.

A primary object of the instant invention is to provide a portable, walking welder which is highly useful in making a uniform series of welds in work having either flat or irregular surfaces.

A further object of the present invention is to provide a walking welder with which a uniform series of welds can easily be made along irregular lines or along lines closely adjacent the edges of irregularly contoured work.

A further object of the present invention is to provide a walking welder in which the step length can be readily adjusted to make either a series of spot welds or a seam weld composed of a number of overlapping welds.

My invention will be more fully understood and further objects and advantages thereof will become apparent when reference is made to the more detailed description of a preferred embodiment of the invention which is to follow and the accompanying drawings in which:

Fig. 1 is an elevation of a preferred embodiment of the apparatus of the instant invention;

Fig. 2 is an elevation of the apparatus of Fig. 1 as seen from the right; and,

Fig. 3 is a diagrammatic illustration of the operation of a part of the apparatus of Figs. 1 and 2.

Referring to the drawings, there is shown a piece of work 2 consisting of two sheets of metal, for example steel or chrome-nickel alloy, supported on a ground plant 4. An electrode 6, adjustably supported in a bracket 8, is shown contacting the upper surface of work 2, the electrode 6 and the ground plate 4 being connected to a conventional source of welding current (not shown) as by leads 9. Bracket 8 is attached to the lower end of a normally upright frame 10 which also carries a mechanism for actuating a foot piece 12.

The mechanism for actuating foot piece 12 may be of any type designed to move the foot piece relative to electrode 6 in general directions both perpendicular to and parallel with the surface of work 2. A convenient form of such a mechanism is shown in the drawings and consists of a rod member 14 to the lower end of which is attached the foot piece 12, the rod being provided with a slot 16 for receiving a pin 18 adjustably fixed to the frame 10. The pin 18 is provided with a fixed collar 20 located between the frame 10 and rod 14. The portion of pin 18 extending through slot 16 is preferably unthreaded and a portion thereof to the left of rod 14 (Fig. 2) is threaded and adapted to receive a washer 22, overlying slot 16, and a nut 24 for maintaining the washer in position. The washer 22 is maintained at a distance from collar 20 which provides for a smooth sliding and pivotal motion of rod 14 about pin 18. A threaded portion of pin 18 extends through a slot 26, provided in the frame 10, there being provided on such threaded portion a nut 28 which, in conjunction with collar 20, fixes the position of pin 18 along slot 26 at any desired point. The foot piece 12 is shown forwardly of the electrode but obviously may be positioned to one side thereof.

The upper end of rod 14 is provided with a bearing 30 for receiving one arm of a crank 32 attached to crankshaft 34. Shaft 34 is journalled in bearings 36 supported by bracket means 38 from the frame 10. Fixed to shaft 34 is a cam 35 arranged to actuate a switch 37 when crank-arm 32 extends generally away from foot piece 12, i. e., when electrode 6 contacts the surface of work 2. The switch 37 actuates a control relay or other devices (not shown) controlling the flow of current to leads 9 in a known manner. Also fixed to shaft 34 is a gear 40 engaged by worm 42, which is driven by a motor 44. The motor 44 is supported by any convenient bracket means 46 from the frame 10 and is connected to a suitable source of electrical energy by means of leads 47. A hand grip 48 is provided at the upper end of frame 10 and a horizontal hand rod 50 may also be provided to aid the operator in manipulating the devices.

In operation, the device is disposed over the work in approximately the aspect shown and the motor 44 is energized. Worm 42 drives gear 40 to turn crankshaft 34 and crank 32. With the arrangement shown, crank 32 will move the upper end of rod 14 over a substantially circular path. The effect of this circular motion on foot piece 12 is diagrammatically illustrated in Fig. 3, wherein points 52, 54 and 56 correspond to positions of pin 18 and curves 53, 55, and 57 are the paths, relative to electrode 6 over which foot piece 12 will travel for the various positions of pin 18. Paths 53, 55 and 57 have the same center 59 and vertical axis 60, but the lateral axes differ in length. Thus adjustment of pin 18 merely changes the "step" length. The axes of the paths also represent components extending generally perpendicular to and parallel with the work surface and it will be understood that these components of foot piece motion will cause "walking" if the perpendicular component is of sufficient length to cause lifting of electrode 6.

In Fig. 1 of the drawing, the pin 18 is shown in a position similar to position 56 in the diagram of Fig. 3, and, with the setting shown, foot piece 12 will tavel, relative to electrode 6, over an elliptical path having a relatively short lateral or parallel component. An ideal disposition of the device in relation to a horizontal work surface is one in which the end of electrode 6 is horizontally aligned with a central point of the vertical or perpendicular component of the path traveled by the foot piece. When the device is so disposed, the foot piece 12 will contact the surface of work 2 during its travel through the lower half of the path and will lift electrode 6 from contact with the surface. During the travel of foot piece 12 along the upper half of the path, the electrode 6 will be in contact with the surface and foot piece 12 will be out of contact therewith. Since the path traveled by foot piece 12 relative to electrode 6 includes a component extending generally laterally of the electrode, or parallel to the work surface, the electrode 6 will be moved in a direction generally parallel to the work surface while the foot piece is in contact with the surface and during travel through the upper half of the path the foot piece, in effect, takes a "step." If it is desired to move the electrode 6 only a short distance over the surface, the pin 18 is lowered on the frame 10 and for longer steps it is raised. It will be understood that the distance at which the foot piece is spaced from the electrode affects the amount of tilting of frame 10 which will render the action of foot piece 12 ineffective to cause walking.

The size relationship and spacing between the electrode, foot piece and work has been somewhat exaggerated, for clarity of illustration. It will be understood that the device of the instant invention is particularly adapted for making a series of closely spaced or overlapping, relatively small welds in foil-like sheets, and, consequently, in practice the axes of the path over which the foot piece travels will be relatively short and the foot piece 12 and electrode 6 will be spaced relatively close together. With such an arrangement the device may be readily used to weld together corrugated or irregularly contoured pieces, and may easily be guided along irregular lines having sharp bends or angles therein. The device may be guided along a line closely adjacent the edge of an irregularly shaped piece of work.

Having thus described my invention in rather full detail, it will be understood that these details need not be strictly adhered to and that various changes and modifications may suggest themselves to one skilled in the art, all falling within the scope of the invention as defined by the subjoined claims.

What I claim is:

1. In a welding apparatus, an electrode having an end portion disposed for contact with a surface of work to be welded, a foot member adjacent said electrode and movable relative thereto over a path having components extending generally perpendicular to and parallel with said surface, and means for moving said foot member into and out of contact with said surface along said path, said generally perpendicular component being of sufficient length to lift said electrode from contact with said surface.

2. In a welding apparatus, an electrode having an end portion disposed for contact with a surface of work to be welded, a frame fixedly supporting said electrode, a foot member mounted on said frame and movable relative to said end portion over a path having components extending generally perpendicular to and parallel with said surface, and means carried by said frame for moving said foot member into and out of contact with said surface along said path, said generally perpendicular component being of sufficient length to lift said end portion from contact with said surface.

3. The apparatus defined in claim 2 wherein said path is substantially elliptical.

4. The apparatus defined in claim 2 wherein said path is substantially circular.

5. The apparatus defined in claim 2 and including means for adjusting the length of said parallel component.

6. In a welding apparatus adapted to be supported by a work surface, a frame, an electrode attached to said frame and having a work contacting portion, a foot member movably mounted on said frame for movement into and out of engagement with said surface, and means for moving said foot member over a path having components extending generally parallel with and perpendicular to said surface, said work contacting portion being aligned with a central point of said perpendicular component.

7. In a welding apparatus, a frame, an electrode attached to said frame and adapted to contact a surface of work to be welded, a rod member slidably and pivotally connected at a midpoint thereof to said frame, a foot piece at one end of said rod member adapted to contact said surface, and means for repeatedly moving the other end of said rod member over a circular path to repeatedly move said foot piece into and out of contact with said surface.

8. The apparatus defined in claim 7, including means for adjusting the position of said midpoint along the length of said rod member.

9. In a welding apparatus, a frame, an electrode attached to said frame and depending therefrom, a rod member having a foot piece at one end thereof adjacent said electrode, means slidably and pivotally connecting a mid-point of said rod to said frame, means for adjusting the distance between said mid-point and one end of said rod, a crankshaft mounted for rotation on said frame, a crank on said crankshaft pivotally connected to the end of said rod opposite said foot piece for moving said rod lengthwise, a cam on said crankshaft arranged to actuate a welding current control switch when said crank points away from said foot piece, and means for rotating said crankshaft.

EDWARD R. POWELL.

References Cited in the file of this patent

UNITED STATES PATENTS

| Number | Name | Date |
|---|---|---|
| 363,320 | De Benardos | May 14, 1887 |
| 853,241 | Helberger | May 14, 1907 |